C. L. CLISE & R. MORGENEIER.
MILEAGE RECORDER FOR PNEUMATIC TIRES.
APPLICATION FILED JUNE 27, 1910.
1,101,406.
Patented June 23, 1914.
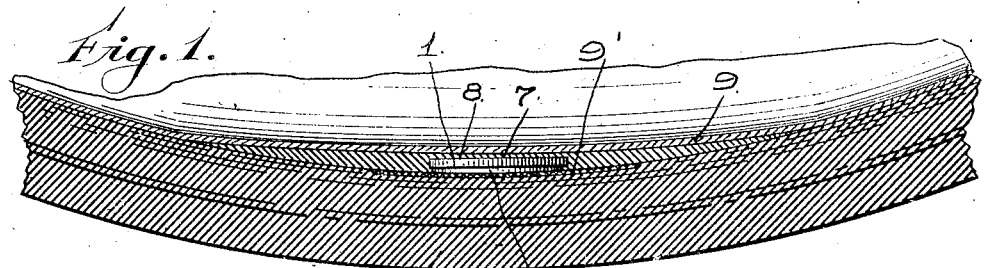
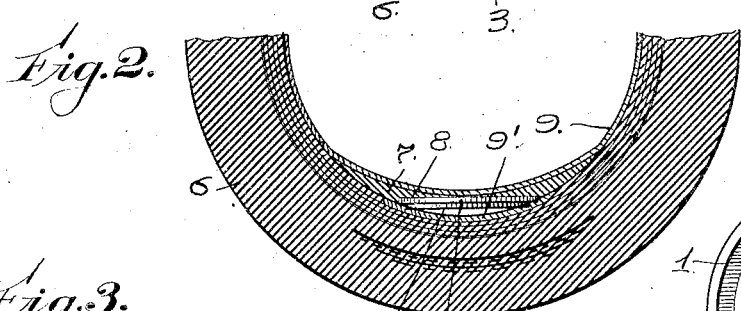
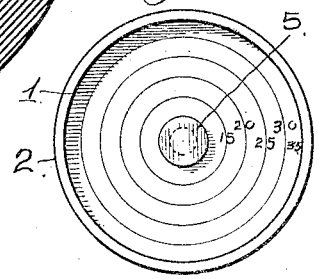
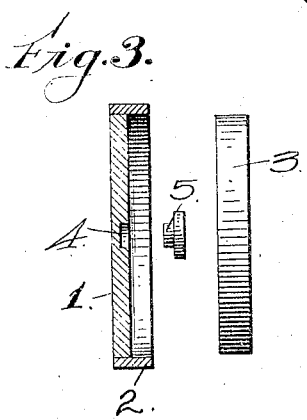
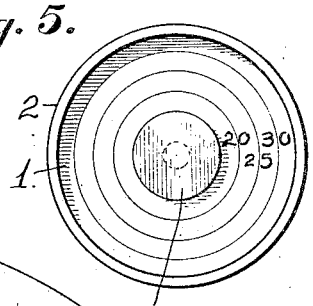
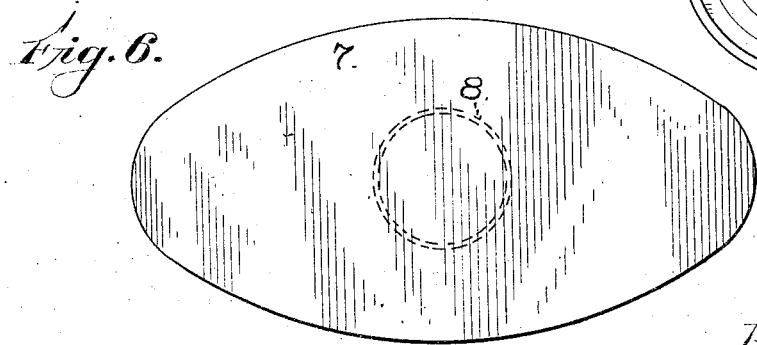

UNITED STATES PATENT OFFICE.

CLAUDE LEWIS CLISE, OF BERKELEY, AND ROBERT MORGENEIER, OF OAKLAND, CALIFORNIA.

MILEAGE-RECORDER FOR PNEUMATIC TIRES.

1,101,406.      Specification of Letters Patent.    Patented June 23, 1914.

Application filed June 27, 1910. Serial No. 569,008.

*To all whom it may concern:*

Be it known that we, CLAUDE LEWIS CLISE and ROBERT MORGENEIER, citizens of the United States, residing at Berkeley and Oakland, respectively, in the county of Alameda and State of California, have invented certain new and useful Improvements in Mileage-Recorders for Pneumatic Tires, of which the following is a specification.
The hereinafter described invention relates to an attachment to be applied to the inner surface of an automobile tire for determining approximately the mileage travel thereof, so as to place beyond dispute on presentation of a worn out tire for allowance adjustment any question as to whether the tire has withstood a guaranteed mileage of travel.

With many manufacturers of automobile tires, it is customary to guarantee their tires for a given number of miles of travel, say thirty-five hundred miles, and to make an agreed allowance adjustment for such tires as do not withstand travel to the extent of such mileage guarantee. However, up to the present time, no means exist as applied within a tire for determining whether or not the tire has withstood the guaranteed mileage of travel, and, as a result, disputes constantly arise between the purchaser and manufacturer over this question when a tire claim is presented for adjustment, with the result that not only is the manufacturer repeatedly imposed upon and grants an allowance for claimed unused mileage travel, but frequently an honest claim is denied by reason of the adjuster's contention that the tire has outrun its mileage guarantee. It is the above conflict between the user and the manufacturer of the tire which the present invention aims to dispose of, by providing a recorder for each tire which will automatically operate throughout the running movement of the tire for preserving an approximate record of the number of miles traveled thereby, so that on the tire being opened for inspection, when presented for an allowance adjustment, the mile travel of the tire may be easily and readily determined, thus placing beyond question as to whether or not the tire has been used to substantially the point of its mileage guarantee, thus enabling a fair and equitable allowance adjustment to be determined between the parties.

To comprehend the invention, reference should be had to the accompanying sheet of drawings, wherein—

Figure 1 is a broken longitudinal section of a tire with our mileage recorder applied thereto. Fig. 2 is a broken transverse section of an automobile tire illustrating the mileage recorder held to the inner surface thereof. Fig. 3 is a broken detail view of the recorder with its parts detached. Fig. 4 is a plan view of the anvil member of the recorder. Fig. 5 is a similar view illustrating the spreading of the malleable member relative to the gage surface of the anvil member. Fig. 6 is a detail view of the securing piece for holding the recording device to the inner face of the tire.

In the drawings, the numeral 1 is used to indicate what may be termed the fixed member of the recording device and, which shall be referred to as an anvil block, which, in the present case, comprises a metallic disk formed with the circular projecting flange 2, providing a depressed seat within which is loosely fitted and works the hammer member 3. This member consists of a metallic disk slightly less in diameter than that of the seat of the anvil member, so as to rest freely within the sphere of the circumferential flange 2 of the said anvil member 1. The anvil member is formed with a central socket 4, into which is snugly fitted or secured in any manner whatsoever the lower end of a short stud or pin 5, which projects slightly above the surface of the anvil member and on which loosely rests the hammer member 3. This stud or pin 5 is formed of any soft malleable material, such as tin, lead, capable of being gradually flattened by the action of the hammer member 3 acting thereagainst during the rotary travel of the tire. On the the inner surface of the anvil member 1 a series of concentric rings are traced, marked respectively 15, 20, 25, 30, 35. The area of surface between these concentric rings or circles represent miles of travel of the tire, and the figures 15, 20, 25, 30 and 35, designate hundreds of miles.

The stud or pin 5 in length and diameter is of a pre-determined size, so that as the same is compressed or flattened out over the surface of the anvil member 1, by the action of the vibratory hammer member 3, the spread thereof relative to the concentric rings or circles on the face of the member 1 will represent the mileage travel of the tire t which the recorder is applied.

When the members 1, 3 and 5 are properly assembled, the malleable member 5 being interposed between the members 1 and 3 and holding the member 3 a slight distance from the face of the member 1, the same are secured to the inner face of the automobile tire 6 by means of the retaining piece 7, which is formed on its inner face with a circular recess or socket 8, into which the member 1 is snugly fitted. This retaining piece 7 comprises preferably an elliptical shaped piece of rubber, fabric or other flexible material, thicker at its center than at its edges, which retaining piece or strip is cemented to the inner surface of the tire, thereby forming a soft pocket into which the recording device is flexibly sealed and held in position relative to the automobile tire. Against this retaining piece the inner tube 9, when inflated, bears and presses the same against the inner face of the tire 6.

To prevent the hammer member injuring the inner fabric surface of the tire, there is placed over the recording device, after being assembled and fitted to the retaining piece 7, a flexible strip 9', which is cemented to the inner surface of the said retaining piece 7, and acts as a seal for the recorder, preventing the displacement of the parts during handling. However, the manner of holding the members of the recorder positioned relative to each other and for securing the same within the tire, is an immaterial feature, which may vary as to meet the requirements of tire manufacturers.

In carrying out our invention we have taken advantage of the vibratory forces engendered within an inflated automobile tire when in action and the pressure strains flowing therefrom, and have provided that these forces and strains shall fall onto a vibrating member and be transferred thereby to a malleable substance interposed between said member and an anvil member, so that, when the inner tube is inflated and the tire in action, any vibrations, pulsations, stresses and changes in pressure will act thereon, through the medium of the hammer or vibrating member, to slowly, but progressively, and in constant exact proportion flatten or spread out the said malleable member or substance, gradually increasing its diameter relative to the gaged surface of the anvil member and leaving thereon a designating record of the total effect, from which the mileage travel of the tire may be readily determined from an inspection of the anvil member, or ascertained by a micrometer reading determined from an established scale of reading measurement as to the flattened area of the malleable member relative to the surface of the anvil member.

With each revolution of a tire when in action with an inflated tube, the recording device being interposed between the said tube and the tire, the shifting strains will act against the loosely held hammer member of the recorder and transmit thereby such strains onto the malleable member, causing a compression and spreading thereof to a limited degree. With each revolution of the tire an added strain is thrown onto the malleable member and the area of its spread slightly augmented, which, constantly and progressively increases as the travel of the tire continues. We have determined, from practical operations, that after the tire has traveled fifteen hundred miles, the malleable member will have been compressed to such an extent that its spread covers the area of the surface of the anvil member to the point represented by the first of the series of concentric circles appearing thereon and marked 15, whereas, when the tire has traveled twenty-five hundred miles, the spread of the said malleable member will be such as to cover the area of surface of the anvil member to the point represented by the third drawn concentric circle, or that marked 25. By the time the tire has traveled thirty-five hundred miles, the spread of the member 5 will cover the entire area of the surface of the anvil member to the point designated by the last of the series of concentric circles, marked 35. Thus, by a mere inspection of the face of the anvil member, where the described gage system is utilized, a substantial accurate reading of the mileage travel of the tire may be obtained. The spreading of the malleable member is the result of the multiple of the strains thrown onto the hammer member during the travel of the tire, each revolution of the tire acting to impart a known degree of flattening thereto. Inasmuch as the generated strains are of the same character with each revolution of the wheel, and as there are a given number of revolutions for each mile of travel, depending on the diameter of the tire, the action of such strains placed onto the hammer member of the recorder for any given distance of travel, causes the spreading or flattening out of the malleable member of the recorder to a pre-determined degree, indicative of such extent of tire travel.

It will be understood and it is obvious that the diameter, thickness, and malleability of the material composing the member or recording medium 5, will influence the spreading thereof relative to the surface of the anvil member of the recorder, and that these factors must be and are taken in consideration and provided for in proper ratio with the measuring surface and the load to be carried.

For securing a reading or ascertaining from the described recorder the mileage travel of the tire, it is required that the retainer 7 be first separated from the inner surface of the tire. The described recorder is hidden from view and in no manner whatever interferes with proper inflation of the inner tube of the tire, nor does it act to injure said tube during the action of the tire.

By the use of the present invention a mileage record sufficient to determine an allowance adjustment is maintained within the tire itself as to the travel thereof, thus placing at rest any question between the user and manufacturer of the tire as to whether the same, when presented for an allowance adjustment, has withstood the guarantee as to mileage travel.

It is obvious that various modifications of the described invention may be employed without departing from the spirit of the invention, which resides in the application within a tire of means for automatically determining the mileage travel of such tire when in action. While the embodiment of the invention as illustrated and described is simple in character, operative, and of the preferred form, still, we do not wish to be understood as confining ourselves to such expressed arrangement of the working parts, but, on the contrary, believing ourselves to be the first to apply within an automobile tire an automatic acting recorder as to mileage travel, wish to be understood as claiming broadly any automatically acting recorder within the tire, which acts during the action of the tire to preserve an approximate record of its mileage travel.

Having thus described the invention what is claimed as new and desired to be protected by Letters Patent is—

1. In an automobile tire, the combination with a record disk situated therein, means for securing the same to the inner face of the tire, and a device co-acting with the record disk and acting thereon for producing a record indicative as to the mileage travel of the tire.

2. The combination with an automobile tire, of automatically operated pressure actuated means applied to the interior thereof for recording on the surface thereof the mileage travel of the tire, said pressure actuated means being independent of the tire structure.

3. In an automobile tire, a pressure actuated mileage recorder applied to the interior thereof, the same comprising an anvil member, a loosely held hammer member, and a malleable member interposed between said members, the spread or compression of said malleable member relative to the surface of the anvil member being indicative as to the mileage travel.

4. A mileage recorder for automobile tires, the same comprising an anvil member containing a mileage gage, a malleable member held thereto, and a pressure actuated member for acting against the malleable member to compress the same relative to the surface of the anvil member for leaving thereon a registry as to miles of travel of the tire.

5. A mileage recorder for application to the interior of an automobile tire, the same comprising an anvil member, a pressure actuated member, a malleable member interposed between said members, and means for securing the positioned members to the inner surface of a tire.

6. A mileage recorder for application to the interior of an automobile tire, the same comprising a relatively fixed member, an opposing pressure actuated member, a malleable medium interposed between said members for acting against the surface of the fixed member to designate thereon the mileage travel of the tire, and means for securing said members in adjusted position within an automobile tire.

7. A mileage recorder for application within an automobile tire, the same comprising a fixed member, a malleable member held thereto, and a pressure actuated member acting thereagainst to compress the malleable member relative to the fixed member for leaving thereon a registry as to the miles traveled by the tire.

8. The combination of a vehicle wheel, a tire therefor, a record receiving means carried by said tire, a record producing means also carried by said tire and coöperating with said record receiving means to record the extent of use to which the tire has been subjected and means carried by said tire for actuating said record producing means.

In testimony whereof we have signed our names to this specification in the presence of two subscribing witnesses.

CLAUDE LEWIS CLISE.
ROBERT MORGENEIER.

Witnesses:
  N. A. ACKER,
  D. F. RICHARDS.